Figure 1:
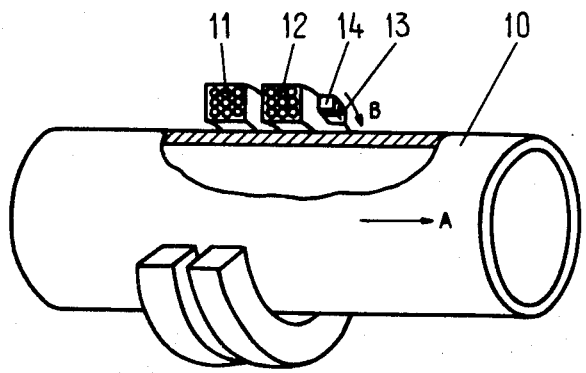

United States Patent
Bergstrand

[15] 3,694,740

[45] Sept. 26, 1972

[54] SYSTEM FOR THE MAGNETIC NON-DESTRUCTIVE TESTING OF MATERIALS FOR LONG AND SHORT DEFECTS

[72] Inventor: Karl Gunnar Bergstrand, Skultuna, Sweden

[73] Assignee: Essem Metotest AB, Fack, Skultuna, Sweden

[22] Filed: Jan. 19, 1971

[21] Appl. No.: 107,726

[30] Foreign Application Priority Data

March 20, 1970 Sweden ...................3830/70

[52] U.S. Cl..................................................324/37
[51] Int. Cl. ............................................G01r 33/12
[58] Field of Search.................................324/37, 40

[56] References Cited

UNITED STATES PATENTS

| | | | |
|---|---|---|---|
| 2,150,922 | 3/1939 | Hay | 324/37 |
| 2,353,211 | 7/1944 | Zuschlag | 324/37 |
| 2,124,579 | 7/1938 | Knerr et al | 324/40 |
| 3,579,099 | 5/1971 | Kanbayashi | 324/37 |

FOREIGN PATENTS OR APPLICATIONS 936,033  9/1963  Great Britain..............324/40

*Primary Examiner*—Robert J. Corcoran
*Attorney*—Waters, Roditi, Schwartz & Nissen

[57] ABSTRACT

A system for electroinductively testing elongated products comprising; a coil system for detecting short defects as seen in the longitudinal direction of the product and inducing a magnetic field in the product to be tested; and a sensing means, e.g. including induction coils, Hall elements or the like, rotating around the product and cooperating with said magnetic field for detecting long defects as seen in the longitudinal direction of the product.

7 Claims, 8 Drawing Figures

3,694,740

SYSTEM FOR THE MAGNETIC NON-DESTRUCTIVE TESTING OF MATERIALS FOR LONG AND SHORT DEFECTS

The present invention relates to a system for the nondestructive electroinductive testing of elongated objects.

The invention relates to electroinductive testing systems of the type described in the Swedish Pat. No. 179,407, although said invention can also be applied to other, similar testing systems, such as those described for example in "Non-Destructive & Testing Handbook," part 2, chapter 38 and 40, New York, 1959, by Robert McMaster.

These known testing systems have the disadvantage, however, that defects in the elongated object, the sample, which is long in relation to the testing means when seen in the longitudinal direction of the sample, can pass through the testing apparatus undiscovered. This is due to the fact that in the case of long defects or faults the counter-connected or balanced coils incorporated in the sensing means sense the same change in the sample, whereby the error signal is balanced out in the coils. A further explanation of this will be given in the following.

A number of apparatus have been proposed for the purpose of eliminating the risk of an elongated defect passing the testing equipment undiscovered. These apparatus normally consist of a measuring coil, by means of which a magnetic field is generated in the sample and which encircles one or more, normally two, sensing probes. The coil and probe combination is caused to move around the sample at right angles to its axial direction. The two probes are arranged sequentially in the direction of rotation and each time the coil-probe combination passes a defect the defect is detected as a variation in the magnetic field in the two sensing probes.

The rotating assembly is sometimes used for total testing purposes, i.e., for testing for both long and short defects as seen in the longitudinal direction of the sample. Thus, the combined coil and probe assembly must be made to rotate around the sample at a high speed relative to the speed at which the sample is advanced, in order that very short defects can be detected.

The rotating combination assembly is also used together with a static testing apparatus of the aforementioned type, to make possible a reduction in the speed at which the assembly is rotated around the sample. This has the disadvantage, however, that two testing stations must be arranged, with accompanying requirements on space and extra measuring equipment and the like.

The most serious disadvantage with rotating testing devices of the aforementioned type, however, is the so-called lift-off problem. The amplitude of a signal generated in the sensing probes as a result of a defect in the sample depends to a great extent on the connection between the sample and the coils, i.e., among other things the distance between coil and sample. The sensitivity of the device to variations in this distance is very great, and in order to compensate for these variations, which regularly occur in practice, so that the signal level in the absence of defects is approximately constant, it is necessary to use highly dynamic amplifiers which have a very high amplification factor. In a known system, the amplification factor of the amplifier is controlled as a function of the aforementioned distance, for the purpose of compensating for the lift-off variations. Even when such signal amplifiers are incorporated in the system, however, there is still a high risk that signals generated in response to defects in the sample will be lost in the lift-off variations.

In an attempt to reduce the disadvantages with lift-off, the feeding-measuring probe combination has also been arranged in contact with the sample during rotation of the assembly. The assembly, which is provided with hard metal shoes, is pressed yieldingly against the surface of the sample by means of weights, springs or the like.

This method of procedure has reduced the lift-off variation to a certain extent, but has also introduced considerable disadvantages associated with the wear of the testing equipment. When the test is carried out in the vicinity of a high temperature production stage, it is almost impossible to provide a durable shoe, and there is a danger of the test equipment damaging the still hot product while rotating around the same.

For the purpose of reducing the aforementioned disadvantages, there is proposed in accordance with the present invention a system for electro-inductively testing the quality of elongated products of substantially constant cross section, in which system for the purpose of detecting relatively short defects in the longitudinal direction of the material there is arranged a coil system which includes at least two induction coils and by means of which an electromagnetic field is induced in the sample to generate eddy currents therein.

The system of the present invention is mainly characterized in that for the purpose of detecting relatively long defects in the longitudinal direction of the material there is also provided a detecting means which rotates transversely of the longitudinal axis of the sample and which cooperates with the electromagnetic field generated by the coil system and which also senses the variations in the field along said transverse direction caused by a defect in the sample.

The means, which may consist of two coils, Hall-effect elements detecting the like arranged sequentially in said transverse direction, are placed preferably externally of the coils forming part of the coil arrangement, as seen in the longitudinal direction of the sample.

Since the detecting means of the present invention is a passive pick-up device which co-operates with a magnetic field generated by means of a static device, it is substantially less sensitive to lift-off effects than the known detecting means and can be arranged to move freely around the longitudinal axis of the sample in spaced relation therewith, i.e., substantially freely. Accidentally, of course, it can touch the sample.

Figure 2:
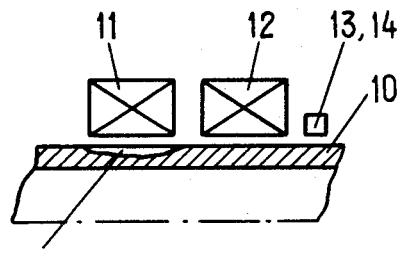
Figure 3:
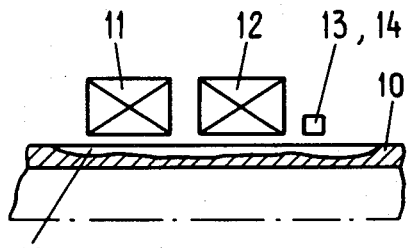
Figure 4:
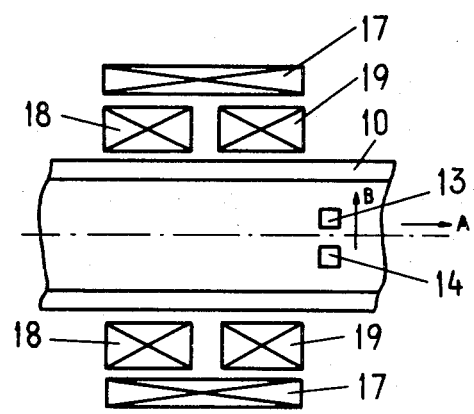
Figures 5, 6:
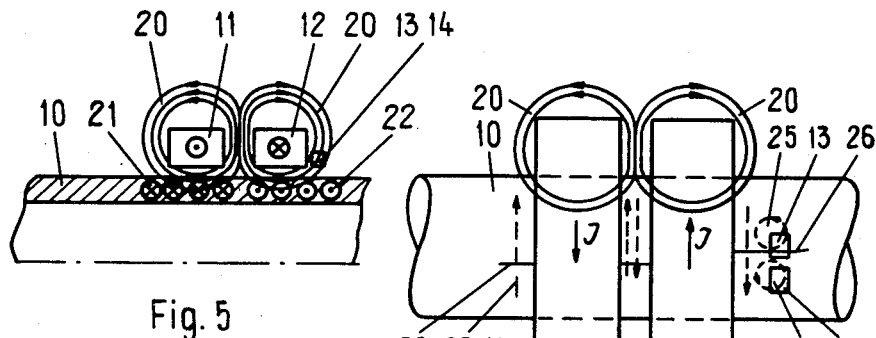
Figure 7:
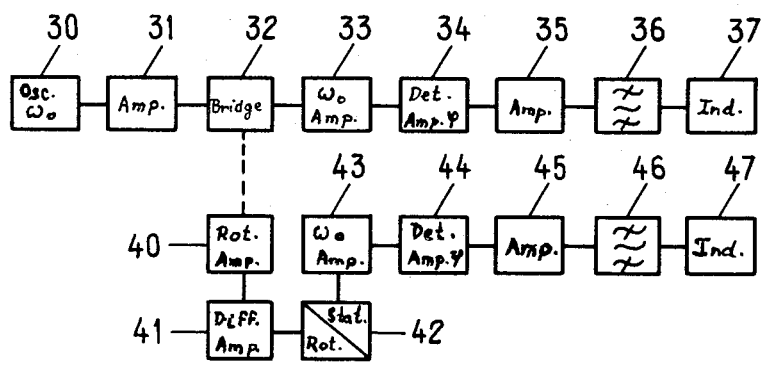
Figure 8:
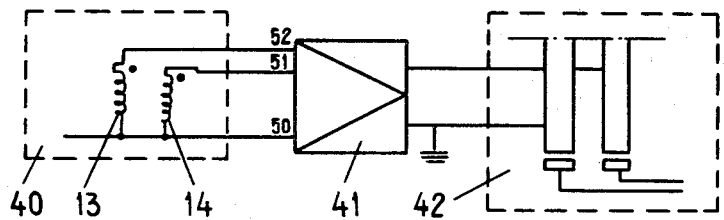

The invention will now be described in more detail with reference to the accompanying drawing, in which FIG. 1 illustrates diagrammatically an electroinductive testing system constructed in accordance with the invention, FIGS. 2 and 3 illustrate short and long defects in the material under an electroinductive testing system according to the invention, FIG. 4 illustrates diagrammatically an alternative embodiment of static testing system, FIG. 5 illustrates diagrammatically the magnetic field generated by the testing system of the invention, FIG. 6 is a top plan view of the system illustrated in FIG. 1, and graphically showing magnetic field and eddy currents occurring as a result of a defect in the sample material, FIG. 7 is an electric block diagram showing the control system of the invention and FIG. 8 illustrates a detail of the block diagram shown in FIG. 7.

FIG. 1 illustrates diagrammatically a system for electroinductively testing the quality of a sample in accordance with the invention. Arranged around the sample 10, which in the exemplary embodiment is a tube, are two coils 11 and 12. During the testing operation, the sample 10 is caused to move through the coils 11, 12, e.g., in the direction of arrow A. The coils 11, 12 are supplied with an AC current from a supply source (not shown), whereupon an electromagnetic field is generated. In turn, the magnetic field produces eddy currents in the sample material and the variations in the eddy-current pattern beneath the coils 11, 12 caused by a defect in the material, cracks, enclosures, needle pricks or the like, as the sample is moved in direction of arrow A cause the complex impedance of the coils 11, 12 to be changed. This change in impedance is detected by means of a differential coupling or a bridge coupling of the coils 11, 12, whereby an error signal indicating defects in the sample material is obtained.

Arranged externally of the coils, when seen in the longitudinal direction of the sample material, are two magnetic field sensing probes 13, 14, e.g., coils or Hall-effect elements, which co-operate with the electromagnetic field generated by the coil 11, 12. By the expression "Hall-effect elements" is meant conventional Hall elements and magnetic field sensing resistors, diodes, transistors or like elements, the function of which is based on the Hall effect. The two probes 13, 14 are arranged to be rotated around the sample material by means (not shown) transversely to the longitudinal axis of the sample, as shown by the arrow B in FIG. 1.

FIGS. 2 and 3 illustrate diagrammatically the operation of the testing system with a short and a long defect in the sample material. The terms short and long defect relate to the extension of the defects in the longitudinal direction of the sample material. For the sake of simplicity, current directions or magnetic field lines are not shown in the drawing.

In FIG. 2, the sample 10 is presumed to have a short defect 15. When the sample 10 is moved past the coil arrangement 11, 12, the impedance is changed in sequence in the coil 11 and 12. This variation in impedance is detected and the detected signal is caused to control an appropriate indicator, as hereinafter described. The change in the impedance of the coils is caused by crowding or diversion of the eddy-currents when meeting the defect.

In FIG. 3, the sample is presumed to have a long defect 16. When the sample is moved past the coil arrangement 11, 12, substantially the same change in impedance will occur in the two coils 11, 12 when a relative position between the coils and the defect 16 shown in FIG. 3 is reached. Consequently, the changes in impedance in the coils 11, 12 are liable to balance each other, whereby the fault passes undetected. This problem is eliminated, however, by the use of the rotating magnetic field probes 13, 14 of the invention. These probes, which are located sequentially in the direction of rotation and which are preferably connected in a differential coupling, sense the variations caused by the long defect 16 in the magnetic field around the sample material, when seen in the direction of rotation, and at each passage of the defect transmit an output signal which is detected in a manner hereinafter described. The radial component of the magnetic field at the probes 13, 14 always generates eddy-currents in the surface of the sample materials 10. These eddy-currents are deflected by a passing defect and the subsequent change in the magnetic field is sensed by the rotating magnetic field sensing probes 13, 14.

In FIGS. 2 and 3, the defects are shown as located at the outer surface of the sample material, although by suitable selection of feed frequency internal faults, or both surface and internal faults, can be detected.

FIG. 4 illustrates a variant of the system according to the invention. The short defect sensing and magnetic field feeding coil arrangement in this instance consist of a separate feed coil 17 and differentially connected measuring coils 18, 19. The three coils 17, 18 and 19 are arranged around the sample 10 and externally of the coil arrangement are located the two rotating sensing coils or Hall-effect elements 13, 14. The operation of the system is substantially the same as that of the testing system illustrated in FIG. 1.

The positioning of the probes 13, 14 and the improved lift-off characteristics of the system will now be discussed with reference to FIGS. 5 and 6.

The magnetic field lines 20 around the coils 11, 12 obtain in the presence of sample 10 approximately the appearance illustrated in FIGS. 5 and 6. Eddy currents are generated in the sample materials which, beneath the coils, are substantially countercurrent to the current I flowing in the coils. These eddy currents are illustrated in FIG. 5 by the crosses 21 and spots 22, and in FIG. 6 by means of the broken arrows 23 between and externally of the coils 11, 12, the magnetic field has a radial component which can not be neglected and which generates eddy currents tangentially in the material. When the sample material is substantially homogeneous, i.e., free from defects, these currents are summated and give a resultant current component which coincides substantially with the eddy currents 23 generated by the axial component of the magnetic field.

When a defect, such as 26 in FIG. 6, passes the testing system, the eddy currents generated by the radial component of the magnetic field are caused to move in paths such as those designated by 24, 25 in FIG. 6. These paths are considerably magnified in the Figure. Thus, in the immediate vicinity of the defect, eddy current components are obtained in the axial direction of the material which, as a result of the defect, do not balance out each other, and in principle it is the disturbances on the homogeneous magnetic field caused by these axial eddy current components which are detected by the probes 13, 14.

It will be evident from the aforegoing that the geometrical configuration of the magnetic field sensing probes 13, 14 must be adapted to the defect to be detected. The physical extension of the sensing coils 13, 14 in the direction of rotation should thus be of the same order of magnitude as the width of the defect 26 in said direction of rotation.

By placing the sensing probes 13, 14 between the feed coils 11 and 12, the advantage is gained whereby the magnitude of the change in the eddy currents increases with the defect 26, i.e., the detected field change becomes greater than if the sensing coils were placed in the position illustrated in FIGS. 1–6. It has been discovered experimentally, however, that the interferences are also amplified to a corresponding degree and hence it is probably not possible to improve the signal to noise ratio by positioning the probes 13, 14 between the coils 11, 12.

For practical reasons, however, the sensing coils or Hall effect elements 13, 14 should be located externally of the coils 11, 12, since it is unsuitable in practice to have the rotating portion of the systems arranged within the stationary portion. The two static, feeding and short defect sensing coils 11, 12 must also be positioned at an accurately determined distance from each other in the longitudinal direction, which distance is often too small for the rotating probe assembly to avoid jeopardizing their function as sensors of short defects. This is explained in more detail in the aforementioned Swedish Pat., Ser. No. 179,407.

Of course, it is possible to position the sensing probes 13, 14 between the feed coils and the short defect sensing coils 11, 12 and to cause the whole of this arrangement to rotate, although this method of procedure has certain disadvantages with respect to the function in the system of the short defect sensing means 11, 12. In this instance, slip rings and brushes must be used to feed power to and remove the signals from the rotating system. The feed voltage to the coils 11, 12 is of the order of 40 V, while the fault signals produced by minor defects may be of the order of 10 mV and less. The contact resistance between slip rings and brushes, which always varies slightly, may thus generate signals whose amplitudes are equally as great as or greater than the signals arising from a defect in the sample.

Measurements taken in practice have indicated that the magnetic field sensing probes 13, 14 should be placed as close as possible to the adjacently located feeding coil 12 and also as close as possible to the sample 10, in order to obtain the best possible signal to noise ratio. This positioning is determined solely by the embodiment used in practice. As mentioned in the aforegoing, however, the probes 13, 14 should preferably be so arranged that only in exceptional cases will they contact the samples 10 during rotation.

The magnetic field sensing probes 13, 14 may be very thin in the radial direction, particularly if Hall effect elements are used, and thus the probes 13, 14, for example with the assistance of a thin, hollow cylinder, preferably of an electrically non-conducting material, can be inserted beneath the adjacently located feed coil 12, between said coil and the sample 10. With this arrangement, it is possible to place the probes in a position in the axial direction of the sample 10 which is optimal for the signal-interference relationship, e.g., immediately beneath the right hand edge of the feed coil 12 (as seen in FIGS. 1–6) or even between the two feed coils 11, 12 in those cases in practice when such positioning is to advantage.

As mentioned in the introduction, the known rotating testing systems are extremely sensitive to lift-off effects. This is because the magnetic field from these systems varies greatly with manner in which the system is coupled electromagnetically to the sample, i.e., with the distance between the testing system and the sample material. For instance, the sample material constitutes a load on the rotating testing system and hence the coil system impedance varies with said distance. The ratio between the feed voltage and the error signal from a minor defect is, also in this instance, of the order of 100 and more, and hence insignificant variations in the coil impedance are along sufficient to drown the fault signals.

By means of an arrangement in accordance with the invention of the feed coils 11, 12 and the rotating probes 13, 14, the disadvantages associated with lift-off are reduced considerably. A change in the distance between the magnet field sensing probes 13, 14 and the sample 10 during the rotation of said probes around said sample causes only a slight change in the geometry between the magnetic field lines 20 and the sensing probes 13, 14, i.e., a slight change in the radial component of the resulting magnetic field at the probes 13, 14 (the influence from all eddy currents included). The probes 13, 14 are passive pick-up elements and the distance variations do not have the wide influence obtained when the feed to the sensing system is also changed with the distance, such as with the case of the known rotating testing systems.

FIG. 7 illustrates a block diagram over the electroinductive testing system of the invention with associated equipment. The following description is made with reference to the embodiment of FIG. 1, although the modifications necessary to obtain other embodiments of the static short fault detecting and feed means, for example as illustrated in FIG. 4, will be aparent therefrom.

A signal having a pre-determined frequency is fed from an oscillator 30 and an amplifier 31 to a bridge 32 in which the feeding and short defect sensing coils 11 and 12 constitute two branches. The bridge 32 is not zero balanced, but is arranged to deliver a certain output voltage, unbalanced voltage, in zero state, i.e., with no defect in the sample being tested. A more detailed explanation of the bridge and its function is given in the aforementioned Swedish Pat. Ser. No. 179,409.

The output signal from the bridge 32 is amplified in a carrier wave amplifier 33, whereafter the amplitude of the resulting signal is detected at a pre-given phase position of the unbalanced voltage in a detector 34. The detective signal is amplified in an amplifier 35 and passed to a band-pass filter 36, where the signals not representing defects in the sample are filtered away. The signal from the band-pass filter 36 controls an appropriate indicating means 37, for example visually indicating, marking the sample 10 at the location of the defect, or is stored in a storage memory element for further processing.

The rotating means, the probes 13, 14 in FIG. 1, for detecting long defects 40 is, as aforedescribed, coupled magnetically to the feed coils 11, 12 in the bridge 32. The sensing coils or Hall effect elements 13, 14 in the rotating sensor 40 are connected to differential amplifier 41, which is arranged in the rotating unit. The amplified difference signal from the differential amplifier 41 is transmitted, via means 42 provided with slip rings and brushes, to the subsequent stationary units, which are identical in all essential details with corresponding units 33 – 37 of the stationary portion in the sensing system. The signal from the differential amplifier 41 and the transmission means 42 is thus transmitted to a carrier wave amplifier 43, an amplitude and/or phase detector 44, an additional signal amplifier 45, a band-pass filter 46 and an indicating means 47.

The elements 40–42 are illustrated in more detail in FIG. 8. The sensing coils or Hall effect elements 13, 14 incorporated in the rotating sensing means 40 are mutually connected to the reference input 50 of the differential amplifier 41 and to their respective difference input 51 and 52 respectively. The output signal from the amplifier 41 is then passed to slip rings and brushes or a similar arrangement in the transmission means 42. The arrangement of the differential amplifier in the rotating unit has the considerable advantage that the signal level at the slip rings and brushes is increased from some tens of microvolts to some volts. Preferably, the carrier wave amplifier 43 connected to the brushes in unit 42 also presents a high input impedance, whereby the influence from the contact resistance between the slip rings and the brushes becomes neglibible.

Thus, with the testing system of the present invention signals are obtained which indicate the presence of long and short defects in the sample. By combining the signals from the band pass filters 36 and 46 it is also possible to determine the total length of the defect, having knowledge of the speed at which the sample 10 is advanced and the speed of rotation of the rotating sensing means 13, 14, by simply counting the pulses between the initial signal and the final signal which a long defect produces in a static sensing means 32, 11, 12.

Thus with the embodiment of the short defect sensing portion 30 – 37 of the system, the signal amplitude is detected at a preset phase position of the unbalanced voltage, as described in the Swedish Pat. No. 179,407. Similarly, with this embodiment of the system 40 – 47 for sensing long defects, the amplitude of the difference signal at the given phase position in relation to the unbalanced voltage is also detected. These signals, which thus indirectly contain information about the amplitude and phase of the two fault signals, provide good information regarding the size, nature and position of the defect.

The testing system of the present invention has been illustrated by means of an embodiment in which the coils 11, 12 and the rotating sensing means 13, 14 surround the material to be tested. In the case of shorter, hollow samples, however, the testing system may be arranged within the cavity of the sample. This may be of importance in the case of thick-wall samples, when it is desired to test the interior surface thereof for defects. It is also possible to arrange the feed coils 11, 12 and the rotating probes 13, 14 respectively on different sides of the material to be tested.

When testing for defects in ferritic material, the sample is magnetized to saturation, e.g., by means of an extra feed coil. In this case, the rotating sensor may also be used as a field leakage sensor, whereupon its position within the system is not critical and, if so desired, the feed coils 11, 12 can be disconnected.

The invention is not restricted to the embodiments illustrated in the drawing, but can be modified within the scope of the following claims.

What is claimed is:

1. A system for electroinductively testing the quality of elongated products having a practically constant cross section, said system for the purpose of detecting relatively short defects in the sample in the longitudinal direction thereof and also relatively extended defects in the longitudinal direction thereof comprising; two coils extending co-axially about the sample and spaced longitudinally thereof and being non-rotatable relative to said sample being tested, said sample being longitudinally movable relative to said coils; an AC current source feeding said coils and inducing an electromagnetic field therein, and eddy currents being induced in said sample, said coils being connected in a bridge arrangement adapted to, upon passing short defects, indicate said defects as unbalances in the bridge arrangement; sensing means rotatable relative to said coils and about the sample for detecting relatively extended defects in the sample; and means for rotating the sensing means around the sample, said sensing means being cooperative with the electromagnetic field generated by the coils and sensing variations in the field caused by an extended defect in the sample and indicating said defect.

2. A system according to claim 1, characterized in that the sensing means is positioned externally of the two coils, when seen in the longitudinal direction of the sample.

3. A system according to claim 1, characterized in that said sensing means is rotatable relative to said sample, said sensing means being in spaced relationship with said sample during at least the major portion of rotation thereabout.

4. A system according to claim 1, characterized in that the sensing means comprises two induction coils offset in relation to each other in the direction of rotation.

5. A system according to claim 1, characterized in that the sensing means comprises two Hall effect elements offset in relation to each other in the direction of rotation.

6. A system according to claim 4, characterized in that the signals from the units offset in relation to each other and incorporated in the sensing means are connected so as to counteract each other.

7. A system according to claim 6, characterized in that the output signals from the bridge arrangement and sensing means are connected to a differential amplifier.

* * * * *